Nov. 5, 1968   O. PUHRINGER   3,408,950
RAILWAY VEHICLE SUPPORTED ON THE WHEEL FLANGES AT CROSSINGS
Filed Jan. 9, 1967   2 Sheets-Sheet 1
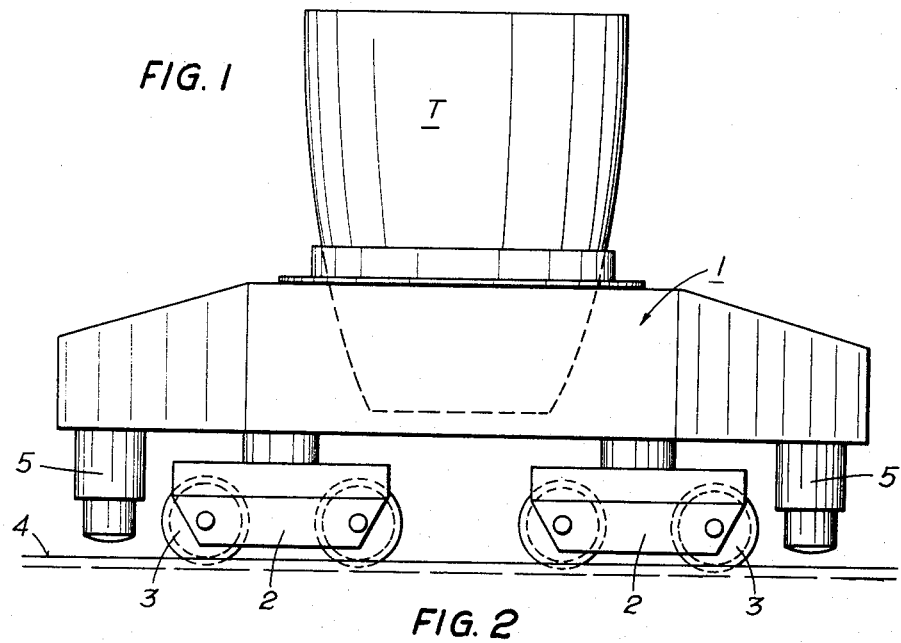
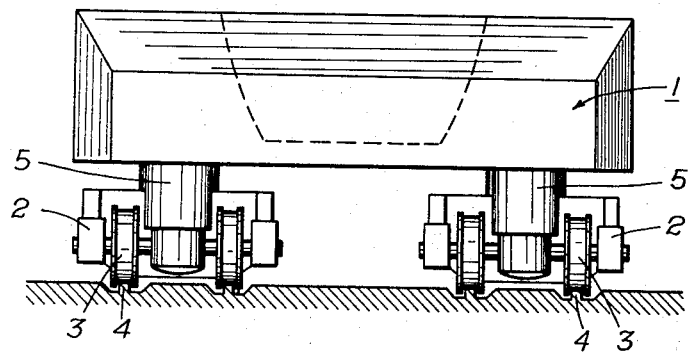
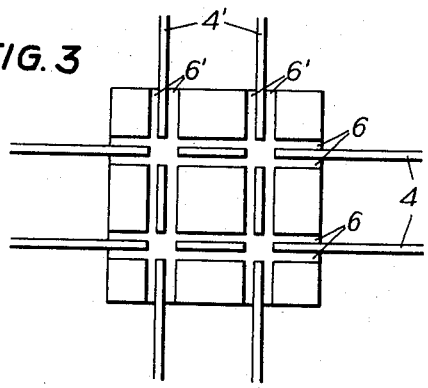
INVENTOR
OTHMAR PÜHRINGER
BY
HIS ATTORNEYS Nov. 5, 1968          O. PUHRINGER          3,408,950
RAILWAY VEHICLE SUPPORTED ON THE WHEEL FLANGES AT CROSSINGS
Filed Jan. 9, 1967          2 Sheets-Sheet 2
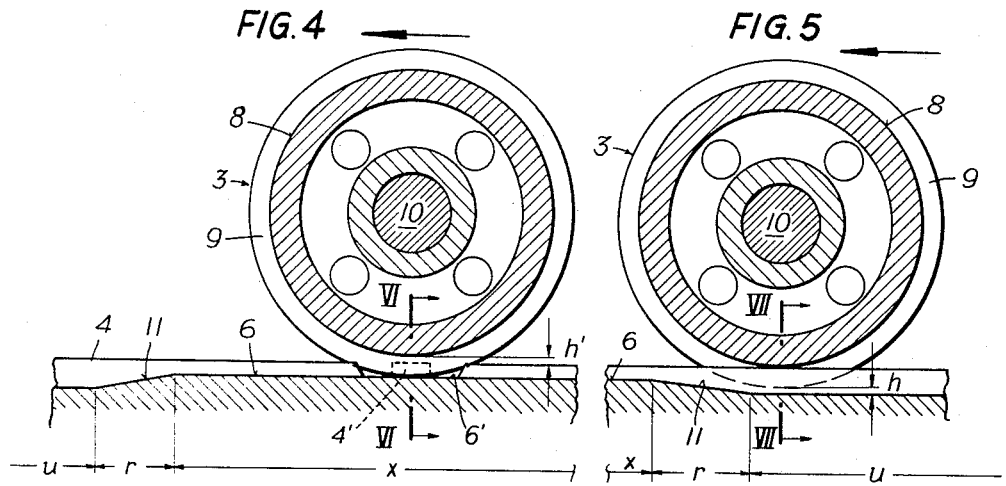
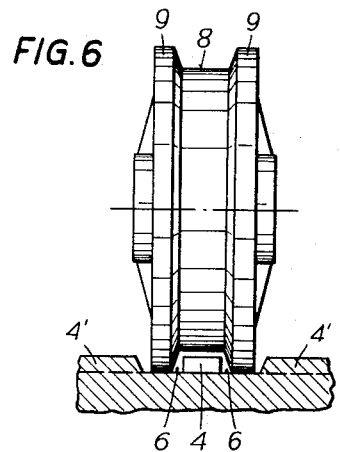
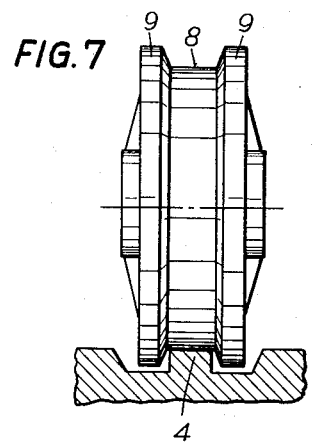
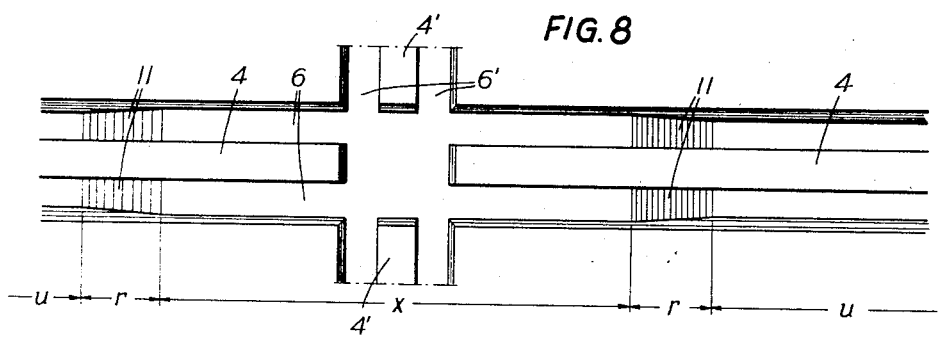
INVENTOR
OTHMAR PÜHRINGER
BY
HIS ATTORNEYS United States Patent Office 3,408,950
Patented Nov. 5, 1968

3,408,950
RAILWAY VEHICLE SUPPORTED ON THE WHEEL
FLANGES AT CROSSINGS
Othmar Puhringer, Linz, Austria, assignor to Vereinigte
Osterreichische Eisen- und Stahlwerke Aktiengesellschaft, Linz, Austria, a company of Austria
Filed Jan. 9, 1967, Ser. No. 608,070
Claims priority, application Austria, Jan. 28, 1966,
A 781
3 Claims. (Cl. 104—141)

ABSTRACT OF THE DISCLOSURE

A rail vehicle for use in a metallurgical plant is described. To avoid impact shocks at rail crossings, the rails are provided with grooves on both sides and are disconnected in the region of the intersection. In the region of disconnection, the groove bottoms are sloped to provide ramps. The rail wheels each have two load bearing surfaces, the first being provided by the wheel tread and the second by the peripheries of the wheel flanges which normally act to guide the wheels on the rail. While on the rail, the wheel flanges are out of contact with the groove bottoms and act merely to guide the wheel on the rail. As a wheel approaches an intersection, the wheel flanges contact the ascending ramp portion of the groove bottom and ride up slightly. In the region of disconnection, the wheel flanges support the full load carried by the wheel. After crossing the intersection the wheel rolls down the corresponding descending ramp, transferring the load from the flanges to the wheel tread portion as it rolls into contact with the rail.

The invention relates to a rail vehicle, particularly to a vehicle for metallurgical plants. It is essential for such vehicles, which are destined to carry very heavy loads, e.g. to transport liquid pig iron or exchange converter vessels, that any rail crossings to be traversed are free of rail joints to avoid dangerous impact shocks.

In up-to-date steel plants, several converters (crucibles) are arranged in a row one beside the other; a re-lining stand and, if necessary, a side stand are provided next to them. A rail vehicle adapted for exchanging crucibles must be capable of serving all these stands. According to the number of blowing stands and other stands, a corresponding number of crossings has to be provided, and the vehicle must be able to traverse these crossings smoothly.

The present invention solves the mentioned problem in a constructionally easy way with a crossing wherein the rails are disconnected in the region of intersection and are accompanied by grooves which, in the region where the rails are disconnected, are less deep than outside that region, and is characterised in that the wheels of the vehicle are provided with two wheel flanges, which are relatively broad as compared with the wheel tread, and are guided in the grooves accompanying the rails, the wheel flanges being higher than the depth of the grooves in that region of the crossing where the rails are disconnected so as to relieve the wheel tread of the load by getting into contact with the slope of the groove bottom.

Advantageously, a number of wheels, preferably four, are supported in a bogie frame, which is pivotally connected to the chassis of the rail vehicle, preferably by means of a ball joint.

In order that the invention may be more fully understood, an embodiment in accordance therewith will now be described by way of example with reference to the accompanying drawings, in which:

FIG. 1 is a side view and FIG. 2 a front view of a rail vehicle for transporting converter vessels;

FIG. 3 is a plan view of a rail crossing, wherein two pairs of rails intersect at an angle of 90°;

FIG. 4 shows in an enlarged view a vertical cross-section of the bottom of the crossing in the region where the rails are disconnected; one of the wheels is shown to be in the center of the crossing;

FIG. 5 corresponds to FIG. 4, but with the wheel having not yet reached the center of the crossing;

FIGS. 6 and 7 show cross-sections along the lines VI—VI of FIG. 4 and VII—VII of FIG. 5, respectively; and FIG. 8 is the plan view of a rail in the region covered by FIGS. 4 and 5.

Numeral 1 (FIGS. 1 and 2) stands for a heavy rail vehicle adapted for transporting a refining vessel T. The vehicle comprises a number of bogie frames 2, each having four wheels 3, which are running on rails 4. Numeral 5 stands for hydraulic lifting means which enable lifting of the car 1 together with the refining vessel T and turning of the bogie frames 2 by 90°.

FIG. 3 shows a plan view of a crossing with rail pairs 4, 4' crossing at an angle of 90°. The rails are disconnected in the immediate neighborhood of the four points of intersection. In the region of the crossing, the rails are accompanied on both sides by grooves 6, 6'. FIGS. 4, 5, and 8 show that outside the region of the crossing, which region is marked u, these grooves are deeper than in the actual region of the crossing and particularly in the region where the rails are disconnected, which is marked x. Between regions u and x, the transition from greater to lesser depth is gradually effected in a shallow ramp region marked r. Thus, as shown in FIGS. 4 and 5, the bottom of the groove defines an inclined plane. The rail vehicle, which is adapted for a shock-free traverse of the demonstrated joint-free crossing, is provided with wheels 3, as shown in FIGS. 4, 5, 6, and 7. These wheels are similar to the usual type of crane wheels. Their running tread is designated by 8. A wheel flange 9 is provided on either side of the wheel tread, said wheel flange being relatively broad as compared with the tread. 10 denotes the wheel axle. FIG. 5 depicts the situation when a wheel, coming from the right side, rolls into the crossing. As shown, the wheel runs on its tread 8 upon rail 4. The depth of the groove 6 outside the crossing (region u) is greater than the height of the wheel flange 9, so that a space h remains free between groove bottom and the wheel flange. In the ramp region r, the groove bottom ascends. The wheel flanges 9 get into contact with ramp 11 and take over the load. In the area where the rails are disconnected, as shown in FIG. 4, the wheel flanges are thus in contact with the groove bottom, while the tread has no contact with the rails, a free space h' being present between wheel tread and rail. Beyond the crossing follows another shallow ramp area 11 sloping in opposite direction, where the wheel tread 8 regains contact with the rails, while the wheel flanges do not touch ground in the deeper grooves beyond the crossing, leaving space h free.

What I claims is:

1. A rail vehicle adapted to traverse rail crossings wherein the rails are disconnected in the region of intersection and accompanied by lateral grooves which, in the region where the rails are disconnected, are less deep than outside that region, the groove bottoms defining inclined planes adjacent to said regions of rail intersection, said vehicle comprising a chassis and a plurality of wheels, each of said wheels having a first peripheral load supporting surface of a given diameter and a second peripheral load supporting surface of a diameter greater than said given diameter, said first load supporting surface running on said rails and said second load supporting surface being received in said lateral grooves for guiding said wheel on said rails, said second load supporting surface running on said groove bottoms in the regions where the rails are disconnected, the difference in diameter between said first and second load supporting surfaces being selected to keep said second load supporting surface out of contact with said groove bottoms in the regions where said first load supporting means are running on said rails, the load carried by said wheel being transferred between said first and second load supporting surfaces as said wheel traverses said inclined planes.

2. A rail vehicle as set forth in claim 1 above wherein said second load supporting surface is provided by the peripheral surfaces of a pair of said greater diameter wheel portions, one on either side of said first load supporting surface.

3. A rail vehicle as set forth in claim 1, wherein said vehicle includes two bogie frames articulated to said chassis by means of ball joints, each bogie frame having two pairs of said wheels mounted thereon.

References Cited

UNITED STATES PATENTS

| | | | |
|---|---|---|---|
| 134,906 | 1/1873 | Lovett | 238—124 |
| 1,280,238 | 10/1918 | King et al. | 105—163 XR |
| 718,297 | 1/1903 | Angerer | 246—456 |
| 1,258,670 | 3/1918 | Gordon | 246—457 |

ARTHUR L. LA POINT, *Primary Examiner.*

H. BELTRAN, *Assistant Examiner.*